April 20, 1948. W. I. JONES 2,439,975
ROTARY TYPE SHIFTABLE FASTENER
Original Filed Sept. 14, 1942
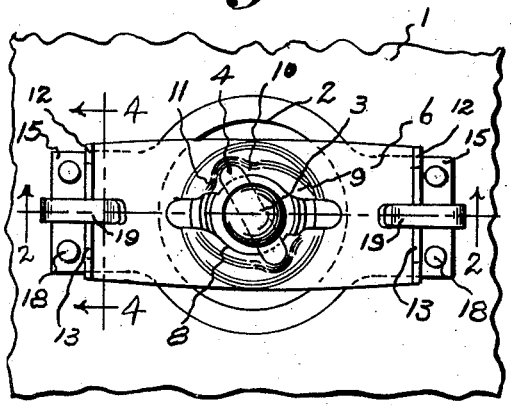
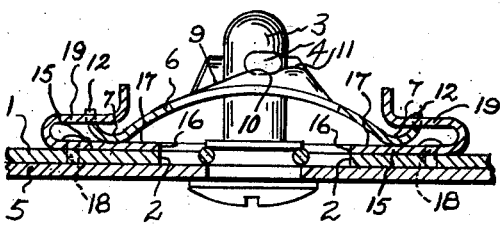
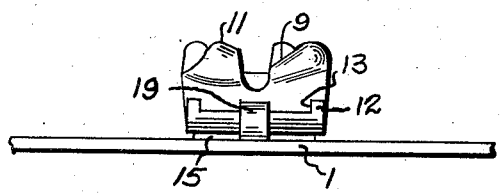
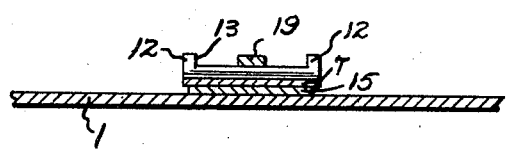
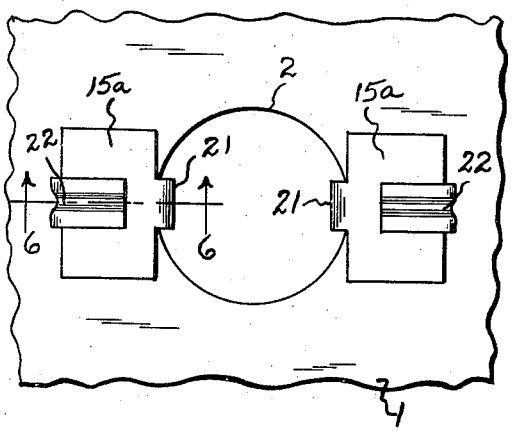
Inventor:
Walter I. Jones Patented Apr. 20, 1948

2,439,975

UNITED STATES PATENT OFFICE 2,439,975

ROTARY TYPE SHIFTABLE FASTENER

Walter I. Jones, Belmont, Mass., assignor to United-Carr Fastener Corporation, Cambridge, Mass., a corporation of Massachusetts Continuation of application Serial No. 458,195, September 14, 1942. This application March 17, 1944, Serial No. 526,932

31 Claims. (Cl. 24—221)

1

The present invention relates to improvements in fastener-secured installations of the type employing a laterally shiftable socket member adapted to cooperate with a rotary stud provided with radial extensions, so as to permit lateral shifting of the support and socket or the support, socket and stud, such as is disclosed in my copending application Serial No. 458,196, filed September 14, 1942, now abandoned.

The present invention has for its principal aims and objects the provision of improved attaching means for the socket member of the fastening.

Other aims and objects of the invention will appear from the following description of preferred embodiments thereof, reference being made to the accompanying drawings, in which Fig. 1 is a plan view of a fastener-secured installation according to one embodiment thereof as viewed from the female fastener or socket side thereof;

Fig. 2 is a longitudinal sectional view thereof as taken on the line 2—2 of Fig. 1;

Fig. 3 is an end elevation thereof;

Fig. 4 is a transverse sectional view as taken on the line 4—4 of Fig. 1;

Fig. 5 is a modified form of attaching member; and

Fig. 6 is a detail sectional view as taken on the line 6—6 of Fig. 5; and

Fig. 7 is a longitudinal sectional view similar to Fig. 2 showing a socket member attached by a modified form of attaching member and with the stud and attaching plate omitted.

Fasteners of the type disclosed herein are extensively used in the construction of aircraft to securely attach one sheet, as for example a cowling sheet, to an underlying support. The support, as indicated at 1 in the drawings, is apertured as at 2 for the reception of a rotary stud 3 having a lateral projection or arm 4, for example a radial pin, said stud being rotatably mounted in the part 5 which may be the cowling or like sheet to be attached to the support. A female fastener or socket member 6 is suitably attached to the rear face of the support and is adapted to receive and interlock with the arms 4 of the stud 3 upon turning movement of the latter. This type of fastening has proved highly effective to hold the parts 1 and 5 together under excessive forces tending to separate them.

As disclosed in my copending application above referred to, it is desirable that the parts secured together be capable of relative flexibility or slippage and hence at least one member of

2 the fastener must be bodily shiftable relative to its attached supporting part. Also frequently it is difficult to accurately pre-locate all fastener-receiving apertures, and in assembling of the parts of the fastener it is desirable that at least one of the fastener parts be shiftable so as to avoid the necessity of bending or distorting one or both of the parts. Furthermore, there is considerable vibration present in aircraft when in flight, and it is sometimes desirable to provide a substantially floatable mounting for one of the fastener parts, so that the fastener assembly when in locked position will have a limited rotation as a whole, without rotating the stud relative to the socket in unlocking position.

The female fastener or socket member 6 may be of any of the approved types formed of sheet metal having bearing sections 7 adapted to bear slidably upon a supporting surface and an intermediate outwardly spaced portion apertured as at 8 to receive the stud 3 and radial arms 4 thereof. The central portion of the member 6 on opposite sides of the aperture 8 is preferably dished outwardly to provide a rigid cam and follower means or track 9, a groove means or seat 10 and a stop 11 for cooperative engagement with the radial arms 4 of the stud 3 upon turning movement of the latter. The socket member 6 is provided with upwardly extending portions 12 beyond the bearing section 7, and is so shaped as to have a pin and slot connecting with the attaching members. As illustrated herein, the portion 12 is formed with an elongated slot or recess 13 adapted to receive a cooperating pin or tongue, hereinafter described, on the attaching member.

According to the invention, and particularly the form shown in Figs. 1 to 4 of the drawings, the socket member 6 may be attached to the support 1 by means of retainer means, such as an attaching plate or base 15 apertured as at 16, so as to surround the support aperture 2, and providing a supporting surface or wear surface 17 for slidably engaging the bearing sections of the socket 6. This plate or base 15 may, if desired, be fixedly attached to the support by suitable means, as for example rivets 18.

The attaching plate is preferably formed with an integral finger or tongue 19 extending radially beyond the supporting or wear surface 17 and curved upwardly and inwardly so that its terminal end is positioned in the slot or recess 13 of the socket member. Preferably the tongue 19 is formed of sheet metal and may be suitably formed to add rigidity and stiffness to the part.

The socket member 6 is thus loosely or floatingly attached to the attaching plate in such a manner that bearing surfaces 7 are free to slide on the wear surfaces 17 of the attaching member laterally, longitudinally and through a limited arcuate movement concentric with the axis of the stud.

The attaching member need not be of one-piece construction nor riveted to the support as shown in Fig. 1, and it may be made of spring metal (such as carbon steel) or not, as desired. There may be provided a separate attaching plate 15a for each bearing section 7 of the socket as disclosed in Fig. 5, and these may be formed with an inturned hook 21 on the opposite side of the wear surface 17 and designed to be hooked over the edge of the support aperture 2 and held in place on the support 1 by tensional engagement with the plate 15a at hooks 21. If desired, an up-struck tongue or detent 22 may be formed on the hook 21 to more securely grip the metal support and hold the attaching member in place. This has the advantage that it avoids the necessity of riveting the attaching plate to the support.

The present application is a continuation of my copending application Serial No. 458,195, filed September 14, 1942, now abandoned.

Although I have illustrated and described preferred embodiments of my invention, I do not wish to be limited thereby because the scope of my invention is best defined by the following claims.

I claim:

1. A fastener for use in securing together an apertured support and a part to be attached thereto which is provided with a rotatably mounted stud, said fastener comprising a stud-engaging fastener member for cooperative engagement with a rotatable stud, retainer means adapted to be mounted on the support and supporting said stud-engaging fastener member, means on said retainer overlying a portion of said fastener member whereby lateral shifting of said stud-engaging fastener member in a plurality of directions relative to the aperture of said support may be effected, and support-engaging means on said retainer disposed intermediate the means which overlie portions of the fastener member.

2. A fastener for use in securing together an apertured support and a part to be attached thereto which is provided with a rotatably mounted stud, said fastener comprising a stud-engaging fastener member provided with spaced bearing portions and retainer means adapted to be mounted on the support and provided with a bearing surface for slidably engaging said bearing portions of said fastener member, said retainer being formed with means overlying and spaced from said bearing portions and integral support-engaging means for attaching said retainer to a support.

3. In a fastener for cowling or the like, a fastener element comprising a metal member having a central aperture and rigid cam means adjacent the aperture adapted to receive and interlock with a cooperating rotary fastener element upon turning movement of the latter, said member having bearing sections beyond said aperture adapted to bear slidably on a supporting structure in a plane spaced from the said cam means, and means on said supporting structure confined within the marginal side edges of said metal member and overlying said bearing sections for loosely attaching said member to said supporting structure, said member being bodily shiftable laterally in at least two directions relative to said supporting structure.

4. In a fastener for cowling or the like, a supporting structure adapted to be attached to an apertured support, a fastener element comprising an elongated metal strip having a central aperture and rigid cam means adjacent the aperture adapted to receive and interlock with a cooperating rotary fastener element upon turning movement of the latter, said strip having terminal end bearing sections beyond said aperture adapted to bear slidably on the supporting structure in a plane spaced from the said cam means, means on said supporting structure overlying said end bearing sections for loosely attaching said strip to said supporting structure and support-engaging means on said supporting structure intermediate said last named means for attaching said structure to a support, said strip being bodily shiftable laterally in at least two directions laterally relative to said supporting structure.

5. In a fastener for cowling or the like, a fastener element comprising a metal strip having a central aperture and rigid cam means adjacent the aperture adapted to receive and interlock with a cooperating rotary fastener element upon turning movement of the latter, said strip having bearing sections beyond said aperture adapted to bear slidably on a supporting structure in a plane spaced from the said cam means, said strip being formed with a transversely elongated recess beyond said bearing section, and a relatively narrow retaining member overlying the end portions of said strip and extending into said recess for shiftably attaching said strip to said supporting structure.

6. A fastener for cowling or the like comprising a plurality of supporting members adapted to be mounted on one face of an apertured support, said members being formed with a hook-shaped portion extending through the aperture of the support and engaging the opposite face of the support, a fastener member adapted to receive and interlock with a cooperating rotary fastener element upon turning movement thereof, said fastener member having bearing sections slidably bearing upon said supporting member, and means on said supporting members overlying said bearing sections and having a tongue and slot connected therewith.

7. In a fastener installation of the character described in combination with an apertured support and a part to be attached thereto which is provided with a rotatably mounted stud having a lateral extension thereon; an apertured female fastener member having spaced bearing sections and an intermediate outwardly spaced apertured seat for cooperative engagement with said rotatable stud, an attaching plate mounted on said support and providing a supporting wear surface for said bearing sections and means connecting the attaching plate to the portion of the female fastener member beyond a bearing section thereof having a tongue and slot connection.

8. A fastener for use in securing together an apertured support and a part to be attached thereto which is provided with a rotatably mounted stud having a lateral extension thereon; said fastener comprising an apertured female fastener member having spaced bearing sections and an intermediate outwardly spaced apertured seat for cooperative engagement with the rotatable stud, an attaching plate adapted to be mounted on the support and providing a supporting wear surface for said bearing sections, and pin and slot means connecting the attaching plate to the portion of the female fastener member beyond a bearing section thereof whereby lateral shifting of the female fastener member on the supporting surface may be effected.

9. A fastener for use in securing together an apertured support and a part to be attached thereto which is provided with a rotatably mounted stud having a lateral extension thereon; said fastener comprising an apertured female fastener socket having spaced bearing sections and an intermediate outwardly spaced apertured seat for cooperative engagement with the rotatable stud, an attaching plate adapted to be mounted on the support and providing a supporting wear surface for said bearing sections, and means connecting the attaching plate to a portion of the socket beyond a bearing section thereof whereby lateral shifting of the socket on the supporting surface may be effected, said last-named means including a tongue on one of said parts and an elongated slot in the other receiving said tongue.

10. A fastener for use in securing together an apertured support and a part to be attached thereto which is provided with a rotatably mounted stud, said fastener comprising a stud-engaging part and means for association with the support adjacent the aperture thereof and loosely engaging the stud-engaging part whereby the stud-engaging part may be bodily shifted laterally relative to the aperture of the support, said means being of less width than said stud-engaging part.

11. A fastener for cowling and the like adapted to be mounted on an apertured support and connected with a rotatable stud mounted in a part to be attached to the support, comprising a stud-engaging fastener member for cooperative engagement with the rotatable stud, a plurality of attaching plates mounted on the support and each providing a separate supporting wear surface supporting a portion of said stud-engaging fastener member and means connecting the attaching plates to the stud-engaging fastener member whereby lateral shifting thereof on the supporting surface may be effected.

12. A fastener for cowling and the like adapted to be mounted on an apertured support and connected with a rotatable stud mounted in a part to be attached to the support, comprising a stud-engaging fastener member having spaced bearing sections, a plurality of attaching plates hooked into the aperture of the support and each providing a separate supporting wear surface for the said bearing surfaces, and each attaching plate having a retaining portion engaging a portion of the stud-engaging fastener member in a manner whereby lateral shifting of said member on the supporting surface may be effected.

13. A socket fastener member for attachment to an apertured support comprising a stud-receiving socket having an elongated base formed with a stud-receiving aperture and a raised stud-engaging seat adjacent said aperture, the terminal end portions of said base being disposed in a plane spaced from the plane of said seat and constituting bearing sections, an attaching member for connecting said socket member to said support comprising an elongated plate supporting said socket and having its terminal ends beyond said bearing sections fixedly attached to said support, said plate providing a supporting surface for said bearing portions and being formed with an intermediate aperture overlying said support aperture and longitudinally disposed means on said plate extending parallel to a longitudinal axis through said terminal end portions overlying said bearing portions, said socket member being bodily shiftable upon said attaching member.

14. A fastening device for detachably securing work surfaces together, comprising a base plate for association with the surface of one work part and adapted to accommodate a fastening stud, a resilient stud-engaging plate superimposing the base plate, means along separated margins of said stud-engaging plate for positioning the stud-engaging portions thereof in spaced relation to said base plate, said base and stud-engaging plate being adapted for telescopic association with said fastening stud, said stud-engaging plate being relatively rotatable with respect to a companion stud and having a stud-engaging surface for causing the stud-engaging plate to be stressed laterally toward the base plate when the stud and stud-engaging plate are relatively rotated in a given direction to thereby clamp said work surfaces together, the base plate presenting fastening tabs and the resilient stud-engaging plate bridging the base plate between said tabs.

15. A fastening device for detachably securing work surfaces together, comprising a base plate for association with the surface of one work part adapted to accommodate a fastening stud, a resilient stud-engaging plate superimposing the base plate, means along separated margins of said stud-engaging plate for positioning the stud-engaging portions thereof in spaced relation to said base plate, said base and stud-engaging plates being adapted for telescopic association with a fastening stud, said stud-engaging plate being relatively rotatable with respect to a companion stud and having a stud-engaging surface for causing the stud-engaging plate to be stressed laterally toward the base plate when a stud and stud-engaging plate are relatively rotated in a given direction to thereby clamp said work surfaces together.

16. A fastening device as set forth in claim 15 wherein the stud-engaging plate includes an annularly continuous body portion.

17. A fastening device as set forth in claim 15 wherein the base plate includes an annularly continuous body portion.

18. A fastening device for detachably securing work surfaces together, comprising a base plate for association with the surface of one work part and adapted to accommodate a fastening stud equipped with a lateral lug carried by another work part, a resilient stud-engaging plate superimposing the base plate, means along separated margins of said stud-engaging plate for positioning the stud-engaging portions thereof in spaced relation to said base plate, said base and stud-engaging plates being adapted for telescopic association and relative rotation with respect to a stud, and a section on said stud-engaging plate cooperating with a lateral lug of a stud to present cam and follower means for causing the stud-engaging plate to be stressed laterally toward the base plate when a stud and stud-engaging plate are relatively rotated in a given direction to thereby clamp said work surfaces together.

19. A fastening device for detachably securing work surfaces together, comprising a base plate adapted to be secured to the surface of one work part and adapted to accommodate a rotary fastening stud equipped with a lateral lug carried by another work part, said stud being equipped with a lateral lug, a resilient stud-engaging plate superimposing the base plate, means along separated margins of said stud-engaging plate for positioning the stud-engaging portions thereof in spaced relation to said base plate, said base and stud-engaging plates being adapted for telescopic association with a fastening stud, and a section on said stud-engaging plate adapted to be engaged by the lateral lug of a stud so as to cause said stud-engaging plate to be stressed laterally toward the base plate when a stud member is rotated in a given direction to thereby clamp said work surfaces together.

20. In a fastener installation of the character described, in combination with an apertured support and a part to be attached thereto which is provided with a rotatably mounted stud; a stud-engaging part formed with an apertured stud-engaging portion, and attaching means having longitudinally disposed tongues overlying and loosely engaging said stud-engaging part whereby the apertured stud-engaging portion thereof may be shifted laterally relative to the aperture of said support.

21. A fastening device for detachably securing work surfaces together comprising a base plate for association with a surface of one work part adapted to accommodate a fastening stud, a resilient stud-engaging plate superimposing the base plate, means for spacing the stud-engaging plate in spaced relation to the base plate, said base and stud-engaging plates being adapted for telescopic association with said fastening stud, said stud-engaging plate being relatively rotatable with respect to a companion stud and having a stud-engaging surface for causing the stud-engaging plate to be stressed laterally toward the base plate when a stud and stud-engaging plate are relatively rotated in a given direction to thereby clamp said work surfaces together.

22. A fastener for use in combination with an apertured support and a part to be attached thereto which is provided with a rotatably mounted stud; said fastener comprising a stud-engaging part formed with an apertured stud-engaging portion, and attaching means for association with a support and provided with longitudinally disposed means wholly confined between the marginal sides of and loosely engaging said stud-engaging part whereby the apertured stud-engaging portion thereof may be shifted laterally relative to the aperture of the support.

23. A fastener for use in combination with an apertured support and a part to be attached thereto which is provided with a rotatably mounted stud; said fastener comprising a stud-engaging socket member formed with a base and an apertured stud-engaging portion, and an elongated attaching member for association with a support and presenting longitudinally extending opposed guides parallel with the longitudinal axis of the attaching member loosely embracing portions of the socket member whereby the apertured stud-engaging portion of the socket member may be shifted laterally relative to the aperture of the support.

24. A fastener for use in combination with an apertured support and a part to be attached thereto which is provided with a rotatably mounted stud; said fastener comprising a stud-engaging socket member formed with a base and an apertured stud-engaging portion, and an attaching member comprising an apertured plate for association with the support and presenting opposed guides loosely embracing portions of the socket member whereby the apertured stud-engaging portion of the socket member may be shifted laterally relative to the aperture of the support, said stud-engaging socket member having end opening recesses for receiving said guides.

25. A fastener unit for use in securing together an apertured support and a part to be attached thereto which is provided with a rotatably mounted stud, said unit including a stud-engaging part and attaching means for association with the support adjacent the aperture thereof to secure said unit to said support, said means including base elements adapted to bear upon one surface of said support and cooperating attaching elements adapted to extend through said aperture to engage an opposite surface of said support.

26. A fastener unit for use in securing together an apertured support and a part to be attached thereto which is provided with a rotatably mounted stud, said unit including a stud-engaging part and attaching means for association with the support adjacent the aperture thereof to secure said unit to said support, said means including base elements adapted to bear upon one surface of said support and cooperating yieldable elements disposed in planes spaced from said base elements, said yieldable elements being of hook-shaped form and adapted to extend through said aperture to engage frictionally an opposite surface of said support from said base elements.

27. A fastener for use in securing together an apertured support and a part to be attached thereto which is provided with a rotatably mounted stud, said fastener comprising an apertured stud-engaging part having end opening recesses, and attaching means adapted to be mounted on a support adjacent the aperture thereof and provided with means extending into said recesses and loosely embracing the stud-engaging part whereby the stud-engaging part may be shifted relative to the attaching means.

28. A fastener for use in securing together an apertured support and a part to be attached thereto which is provided with a rotatably mounted stud, said fastener comprising an apertured stud-engaging part having openings accessible from opposite ends thereof, and attaching means adapted to be mounted on a support adjacent the aperture thereof and provided with means extending into said openings and loosely embracing the stud-engaging part whereby the stud-engaging part may be shifted relative to the attaching means.

29. A fastener for use in securing together an apertured support and a part to be attached thereto which is provided with a rotatable stud, said fastener comprising a stud-engaging part provided with a stud-receiving aperture, and an elongated attaching member adapted to be secured to a support and having a fastener-supporting base portion of greater length than the width of said stud-engaging part, and hook-shaped retainer means extending from the end portions of the attaching member beyond said stud-engaging part for shiftably retaining said parts together.

30. A fastener for use in securing together an apertured support and a part to be attached thereto which is provided with a rotatable stud, said fastener comprising a stud-engaging part provided with a stud-receiving aperture, an elongated attaching member having apertured end portions for attachment to a support, and cooperating tongue and recess means for shiftably retaining said stud-engaging part on said attaching member, one of said means being disposed parallel to a longitudinal axis through the apertured end portions of the attaching member.

31. A fastener for use in securing together an apertured support and a part to be attached thereto which is provided with a rotatable stud, said fastener comprising a stud-engaging part provided with a stud-receiving aperture, an elongated attaching member having apertured end portions for attachment to a support, and cooperating tongue and recess means for shiftable retaining said stud-engaging part on said attaching member, said tongue means being disposed parallel to the longitudinal axis of said attaching member.

WALTER I. JONES.

REFERENCES CITED

The following references are of record in the file of this patent:

UNITED STATES PATENTS

| Number | Name | Date |
|---|---|---|
| 2,281,455 | Powell | Apr. 28, 1942 |